United States Patent [19]

Silverman

[11] 3,757,420

[45] Sept. 11, 1973

[54] DENTAL OPERATIVE SYSTEM

[76] Inventor: Ralph H. Silverman, 7701 Arcadia, Morton Grove, Ill. 60053

[22] Filed: Aug. 25, 1971

[21] Appl. No.: 174,602

[52] U.S. Cl. .................................................. 32/22
[51] Int. Cl. ............................................ A61c 19/02
[58] Field of Search ....................................... 32/22

[56] References Cited
UNITED STATES PATENTS 3,497,955    3/1970   Gallagher.............................. 32/22

*Primary Examiner*—Robert Peshock
*Attorney*—Ronald J. LaPorte

[57] ABSTRACT

A dental operative system includes a plurality of mobile dental chairs for carrying patients along a path past dental treatment stations provided in spaced relation about the path. Dental personnel at each station provide a preplanned phase of dental treatment to a patient transported to the station. Controls are provided to direct the movement of the dental chairs along the path to subsequent stations upon completion of each phase of the treatment.

9 Claims, 2 Drawing Figures

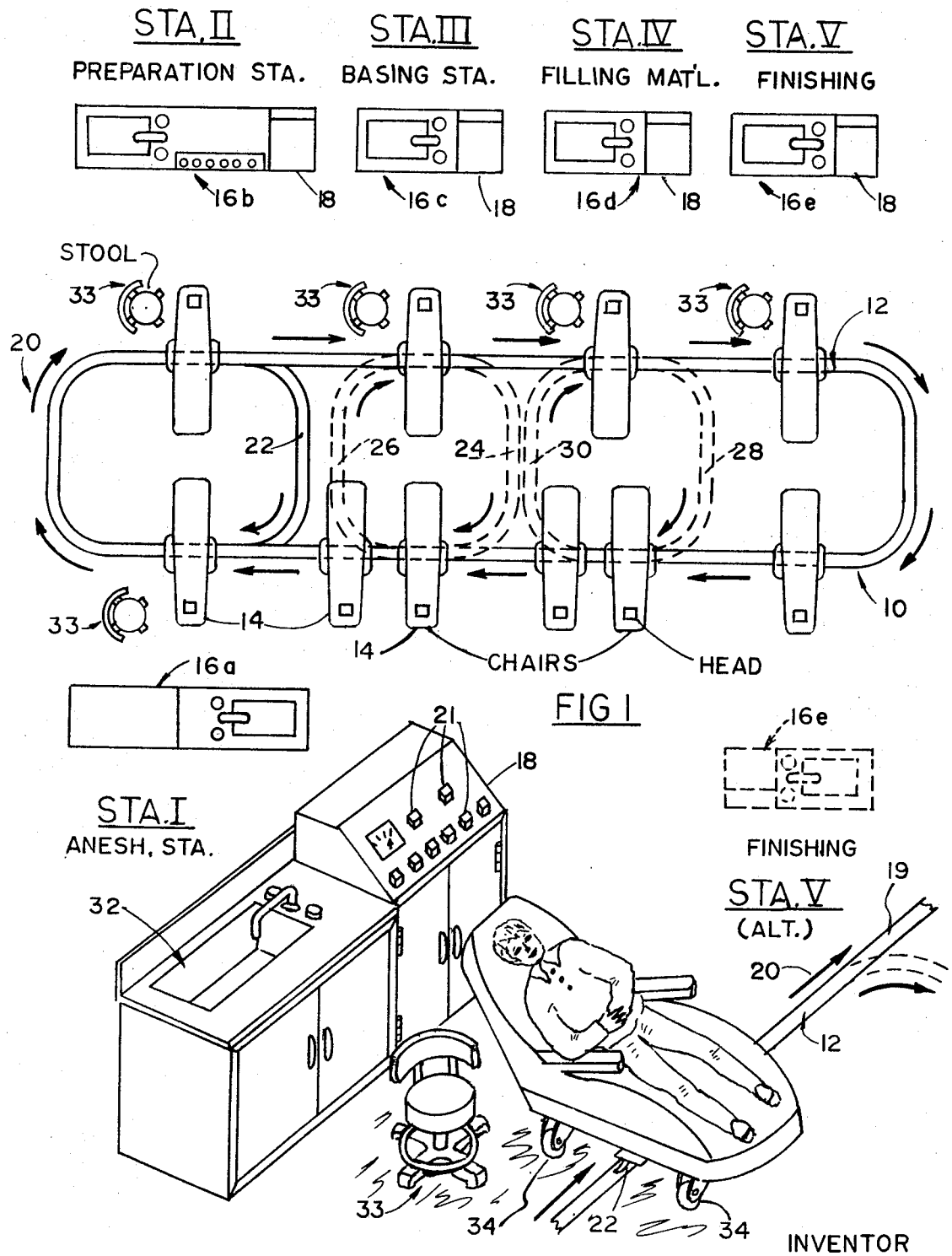

DENTAL OPERATIVE SYSTEM

BACKGROUND

This invention relates to a dental operative system and method for administering dental care to large groups of patients with a minimum of dental personnel.

As the population of the country and the world continues to increase, the demands of the public for proper dental care increase as well. Because the number of dentists has not increased proportionally with the population, some means must be provided to enable the existing number of dentists to administer to the public needs with the help of trained dental assistants. Furthermore, because at present the field of operative dentistry; i.e., corrective administration to patients for tooth decay, requires from 60–80 percent of the dentist's office time, a solution of the problem should be directed first toward reduction of man hours per patient in this area.

Group treatment of patients appears to be an answer to the above problem but as yet no dental facility or method has been devised to provide for the adequate and efficient care of many patients on a highly professional basis and at a relatively low cost.

SUMMARY

Accordingly, it is a primary object of the present invention to provide a new and improved dental operative system for administering to groups of patients efficiently and effectively with a minimum of licensed dentists and dental personnel generally.

It is another object of the present invention to provide a dental operative system of the above-described type primarily for use in treating tooth decay.

It is yet another object of the present invention to provide a dental operative system of the type described wherein dental patients receive professional care quickly and efficiently.

It is still another object of the present invention to provide a new and improved dental operative system for accommodating groups of patients in relatively short periods of time and at a relatively low cost.

It is a further object of the invention to provide a new and improved method of treating groups of dental patients efficiently and effectively.

Briefly, a preferred embodiment of a dental operative system according to the invention includes a closed loop path over which mobile patient carrying dental chairs are propelled at a slow speed. Several stations whereat a patient is given treatment are located along the path. Controls at each station enable a dentist or trained assistant to transport the patient in a mobile chair on to the next station subsequent to the completion of treatment at that station. In the event a patient must be returned to a preceding station, alternate paths are provided.

In a preferred arrangement of the dental operative system designed specifically for the treatment of tooth decay, one or perhaps, two dentists and a plurality of dental auxiliaries or trained assistants are employed.

Subsequent to X-rays, preliminary diagnosis and the formulation of a treatment plan, preferably in a dental center housing the dental operative system according to the invention, the patient proceeds to the latter. The patient is seated in a mobile dental chain at a first station whereat local anesthetic is administered. Upon completion of this procedure, a control at the station is operated to move the patient in the movable dental chair, to a second station along a predetermined path.

Upon arrival at station No. II, the chair is stopped automatically before a dentist and auxiliary located thereat. The dentist prepares the teeth having cavities therein by drilling and the like. Thereafter, upon completion of the removal of decayed tooth material, the dentist operates the chair control mechanism to move the patient in the mobile chair to Station No. III. In the event the patient is not sufficiently anesthetized upon his arrival at station No. II, the mobile chair could be returned to station No. I for reanesthetization. This is accomplished by directing the chair along an alternate return path connecting station No. II with station No. I.

Subsequent to the cavity preparation by the dentist and his auxiliary at station No. II, the patient in the mobile chair is sent on to station No. III staffed by one auxiliary or trained dental assistant. At station No. III, matrices, cement bases and the like are applied. Subsequent to the latter, the chair is moved on to station No. IV likewise staffed by one dental assistant. At station No. IV, filling materials and the like are placed into the prepared cavity sites. From station No. IV, the chair and patient are moved to station No. V, also staffed by one auxiliary. The matrices and wedges are removed and the fillings are finished and carved. At this time, the patient may be dismissed or the chair may be returned to the first station and the patient may be dismissed therefrom.

DESCRIPTION OF THE DRAWING

A better understanding of the present invention and its organization and construction may be had by referring to the description below in conjunction with the accompanying drawing:

FIG. 1 is a diagramatic representation of a dental operative system according to the invention; and FIG. 2 is a pictorial representation of a typical dental station incorporated in the dental operative system according to the invention.

DETAILED DESCRIPTION

Referring now to the drawing in greater detail, wherein like numerals have been employed throughout the various views to designate similar parts, there is shown in FIG. 1, a preferred embodiment 10 of a dental operative system according to the invention.

The specific embodiment 10 has been designed to accommodate dental patients requiring dental operative care, i.e., the preparation and treatment of cavities in the teeth, and as such the description of the dental operative system will be directed to the use thereof for the purpose described. The system, as will be described in greater detail hereinafter, is not restricted to such use, however.

Generally, the dental operative system 10 comprises a path 12 set out in a predetermined arrangement, herein shown as an elongated closed loop. A plurality of movable dental or patient carrying chairs 14 are provided on the path for movement therealong past dental treatment stations 16a, 16b, 16c, 16d, 16e and 16e' arranged in spaced relation with respect to each other thereabout. The movement of the chairs about the path 12 is controlled by electronic means at electronic control panels such as 18 (see FIG. 2) located at each of the stations.

The movable chair arrangement may be similar to a movable car arrangement wherein a car rides along a metallic tape positioned in or on the floor, such as 19 (FIG. 2) to transport persons therealong. An electric motor (not shown) mounted in the chair 14 provides the driving force therefor and a sensor 22 extending from the chair toward the metallic tape, guides the chair therealong. The tape is perfectly harmless if touched or stepped on by persons walking thereover. The control panels, such as 18, including a plurality of control buttons 21, are connected electrically to the system for operation thereof to transport patients in respective chairs from station to station, each control panel being operable for a predetermined section of the tape.

Other suitable drive arrangements may be used as well, and still fall within the scope of the invention. Such other drive arrangements will be obvious to one skilled in the art.

Before entering the dental operative system, the patient is given X-rays to determine the location of cavities, etc., and a preliminary diagnosis is made. The physical location for taking X-rays and working preliminarily with the patient can be, for convenience, in a dental center which also houses the dental operative system according to the invention. After preliminary examination and diagnosis, the patient may then proceed readily to the dental operative system.

In the specific arrangement of the dental operative system 10, five stations are provided about the closed loop path 12. In practice, patients requiring treatment are seated in the movable chairs at station No. I. Thereat, the patient's chart is examined and the patient is given anesthesia, normally in the form of a hypodermic injection of Zylocaine or the like anesthetic. The administering of anesthesia is performed usually by a licensed dentist stationed thereat. Where permitted, however, the anesthesia could be provided by an auxiliary or dental assistant.

Subsequent to the administering of anesthesia, the dentist operates a forward control button 21 on the control panel 18 at station No. I to propel the chair with the patient therein about the path 12 in the direction of arrows 20 to station No. II. Once arriving thereat, the chair stops automatically in the station area.

A dentist, and, if necessary, an auxiliary are present at station No. II. Hereat the dentist uses the conventional drilling and the like equipment to prepare the cavity sites for filling at the subsequent stations.

After preparation of the cavity sites has been completed, the dentist or his assistant operates the chair controls 21 at station No. II to transport the patient in his chair on to station No. III. In the event the patient should arrive at station No. II and the dentist should find that the local anesthesia administered at station No. I has not successfully deadened the area sufficiently well to permit drilling, the patient may be returned to station No. I for additional anesthesia via return path 22. To accomplish the latter, separate controls activating the alternate path electrically are provided so that the chair traverses the latter path rather than proceeding along the normal path 12. Assuming that the preparation of the cavity sites has been completed properly without the need to return the patient to station No. I, the dentist at station No. II operates the control on the local panel provided thereat to send the patient on to station No. III staffed by a single dental assistant. At station No. III, normal basing procedure is employed; i.e., matrices, cement bases, wedges and the like are applied to the teeth for reception of the filling materials.

It should be noted that as an option, a pair of return paths 24, 26 may be located between station No. I and station No. III. The last-mentioned paths provide a means to return the patient in his dental chair directly to station No. I (boarding station) and if necessary to return the patient to station No. III directly also. Normally, however, once reaching station No. III for the application of basing materials, a need should not arise to return the patient to the boarding station No. I.

Upon completion at the basing station No. III, the patient in his movable dental chair is transported on to station No. IV staffed by a single auxiliary. At station No. IV, filling material is placed into the prepared cavity sites. Likewise at station No. IV there may be provided optional alternate paths 28, 30 to transport the patient back to station No. 1 if it becomes necessary and to return the patient to staton No. IV directly. Again, however, at this point in the administration of treatment to the patient, a return trip to station No. I should normally be unnecessary.

After the dental auxiliary has completed the filling process at station No. IV, the chair control is operated to move the patient to the final station, station No. V, for finishing. Upon arrival at station No. V, just as at the former stations, the chair comes to a stop automatically. Finishing station No. V is manned by a single dental assistant No. V also. At station No. V, the matrices and wedges, etc., are removed from within the patient's mouth. The fillings which have at this time become hardened, are carved and polished with appropriate tools and thereafter the patient is dismissed from the center.

It should be noted that the location of station No. V is shown at two places about the closed path 12. In the event it is desired to dismiss the patients from the area in the dental operative system directly adjacent the boarding station, then station No. V can be positioned as shown in dotted lines, where added and designated 16e'. In this manner, fewer personnel need be employed since a single group of dental assistants or the like can staff both the patient boarding and dismissal areas.

In the event, however, the first location 16e is advantageous, such as, for example, because of access to an exit, etc., of the dental center in which the system is housed, then station No. V could be placed thereat.

A typical treatment station is illustrated in FIG. 2 of the drawing. In the figure it can be seen that there is provided a sink and cabinet combination 32 for storage of materials and dental equipment. At the cavity preparation station No. I there is also included high speed drilling equipment, etc., for use by the dentist in preparation of the cavity sites. An adjustable movable stool 33 is provided at each of the stations to enable a dentist or assistant to move about the patient for treatment.

Adjacent the dental equipment cabinet and sink is located the mobile dental chair control panel 18 including electronic equipment and controls 21 for controlling the movement of the dental patient carrying chairs.

As can be seen in FIG. 2, chairs of the reclining type are provided so that a patient is in a relaxed position during transportation and treatment. The chair includes rollers 34 mounted thereon which carry the chair and patient from station to station. The chair is guided along the path 12 by means of sensor 22 which senses the electronic guide tape 19 along the path. The motor drive (not shown) within the base of chair 14 propels the chair along the path.

As mentioned heretofore, while the specific embodiment of the dental facility has been described in conjunction with the treatment of tooth decay, the use thereof is not limited thereto. The facility may be used in many other aspects of dentistry such as, for example, in administering flouride treatments to large groups of patients, in oral surgery, pedodontics, the application of enamel fissure sealants, laser beam treatments and the like.

It has been estimated that through the use of the dental operative system according to the invention, the number of patients administered to in a single day could rise by 500 percent while still maintaining high professional standards and providing the patient with exceptionally good treatment.

The dental operative system eliminates unnecessary walking by the patient and dentist and generally eliminates inefficiency due to waiting time for each phase of the treatment as in conventional dental treatment rooms. Furthermore, with the dental operative system, dental equipment can be used at maximum efficiency and the cost of construction of such a system is minimal. The dental operative system according to the invention has great potential for use in the armed services wherein greater numbers of persons requiring dental care can be treated on a mass basis.

Thus, the dental operative system according to the invention provides a relatively low cost, efficient means for accommodating groups of dental patients in relatively short periods of time while maintaining high professional standards.

While a particular embodiment of the invention has been shown and described, it should be understood that the invention is not limited thereto since many modifications may be made. It is therefore contemplated to cover by the present application any and all such modifications as fall within the true spirit and scope of the appended claims.

I claim:

1. Apparatus for handling a plurality of dental patients, simultaneously, including in combination: means defining a predetermined path, a plurality of mobile chair means for accommodating the dental patients, each said mobile chair means being movable along said predetermined path, means for coupling said mobile chair means to said path for guiding the latter therealong, a plurality of dental treatment stations located along said path in spaced relation with respect to each other, each said dental treatment station including dental equipment for use in providing dental treatment to a patient while the patient remains in said mobile chair means, and control means operatively coupled to said plurality of mobile chain means for controlling the movement of the latter between stations along said path.

2. Patient handling apparatus as claimed in claim 1 wherein said path comprises a closed loop passing adjacent said plurality of dental treatment stations, and wherein a first one of said stations comprises a boarding area whereat patients are positioned in said mobile chair means.

3. Patient handling apparatus as claimed in claim 2 further including auxiliary path means connecting said first one of said stations with at least one other of said stations located about said closed loop path.

4. Patient handling apparatus as claimed in claim 2 wherein said first one of said stations and the last of said plurality of stations are positioned adjacent each other along said loop path so that patients receiving treatment are admitted and dismissed from said mobile chair means substantially at a common area.

5. Patient handling apparatus as claimed in claim 1 wherein said control means include a plurality of electronic control devices coupled electrically to said mobile chair means, one of said control devices being provided at each of said treatment stations for transporting said chair means between said station and an adjacent station along said path.

6. Patient handling apparatus as claimed in claim 5 further including electronic guide means placed along said path, wherein each of said mobile chair means includes electronic sensor means coupled electronically with said guide means for guiding said chair means along said path and electric motor means for driving said chair means along said path, and wherein each of said control devices is coupled electrically to said chair means for controlling the movement thereof along said guide path.

7. Patient handling apparatus as claimed in claim 1 including at least three dental treatment stations spaced along said path, a first one of said stations including means for applying a local anesthetic to a dental patient, a second one of said stations adjacent and spaced from said first station including means for removing decayed material from the teeth of said patient at cavity sites therein, and a third station spaced from said second station along said path including means for applying filling materials to said prepared cavity sites.

8. A method for handling, simultaneously, a plurality of dental patients, comprising the steps of: providing a predetermined path having a plurality of mobile chairs coupled thereto for controlling movement therealong, positioning patients in said mobile chairs at a predetermined location along said path, one per chair, controlling the movement of said chairs to transport said patients along said predetermined path to successive predetermined ones of a plurality of treatment stations spaced along said path and performing successive steps of a predetermined dental procedure on said patients at said predetermined ones of said stations, respectively and subsequent to the performance of the final step of said dental procedure, returning said patients in said mobile chairs to a predetermined location along said path.

9. A method for simultaneously handling a group of dental patients, comprising the steps of: providing a predetermined path having a plurality of movable chairs coupled thereto for controlled movement therealong, positioning said patients each in one of said chairs at a predetermined location along said path, controlling said chairs to move the latter in succession along said predetermined path to a first predetermined one of a plurality of treatment stations, stopping said chairs as they arrive at said first predetermined one of said treatment stations for a predetermined period of time, performing a first step of a predetermined dental procedure on said patients during said predetermined time periods, controlling said chairs to move the latter successively to other ones of said plurality of said treatment stations, performing additional steps of said dental procedure at said last-mentioned other treatment stations, respectively and subsequent to the performance of a predetermined step of said dental procedure at one of said other of the plurality of said dental treatment stations, returning said patients successively in said movable chairs to a predetermined location along said path.

* * * * *